(12) United States Patent
Maron et al.

(10) Patent No.: US 7,431,133 B2
(45) Date of Patent: Oct. 7, 2008

(54) METHOD FOR ACTUATING AN ELECTROMECHANICAL PARKING BRAKE DEVICE

(75) Inventors: Christof Maron, Kelkheim (DE); Georg Roll, Heusenstamm (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 250 days.

(21) Appl. No.: 10/524,552

(22) PCT Filed: Jul. 28, 2003

(86) PCT No.: PCT/EP03/08303

§ 371 (c)(1),
(2), (4) Date: Oct. 7, 2005

(87) PCT Pub. No.: WO2004/022394

PCT Pub. Date: Mar. 18, 2004

(65) Prior Publication Data

US 2006/0131113 A1    Jun. 22, 2006

(30) Foreign Application Priority Data

Aug. 13, 2002  (DE) ................. 102 36 968

(51) Int. Cl.
*B60L 7/00* (2006.01)
*B60T 13/00* (2006.01)

(52) U.S. Cl. ................. 188/162; 188/158; 188/265; 303/20

(58) Field of Classification Search .......... 188/158, 188/161, 162, 265, 181 T; 303/89, 20
See application file for complete search history.

(56) References Cited

U.S. PATENT DOCUMENTS

| 6,209,689 | B1 * | 4/2001 | Bohm | 188/158 |
| 6,321,884 | B1 * | 11/2001 | Balz | 188/161 |
| 6,382,741 | B1 * | 5/2002 | McCann et al. | 188/265 |
| 6,738,703 | B2 * | 5/2004 | Ewinger et al. | 701/70 |
| 7,140,697 | B2 * | 11/2006 | Koga et al. | 188/162 |
| 7,227,324 | B2 * | 6/2007 | Erben et al. | 318/430 |
| 2005/0046271 | A1 * | 3/2005 | Suzuki et al. | 303/20 |

FOREIGN PATENT DOCUMENTS

| DE | 100 33 344 A1 | 1/2002 |
| EP | 0 275 783 A2 | 7/1988 |
| WO | WO 99/45292 | 9/1999 |
| WO | WO 02/46016 A1 | 6/2002 |
| WO | WO 0246016 A1 * | 6/2002 |

* cited by examiner

*Primary Examiner*—Thomas J Williams
(74) *Attorney, Agent, or Firm*—RatnerPrestia

(57) ABSTRACT

A method for actuating an electromechanical parking brake device for a brake that can be actuated by an electromechanical actuator comprised of an electric motor and of a reduction gear connected downstream of the electric motor and provided for converting a rotational motion into a translatory motion. In order to guarantee that the electromechanical parking brake device works reliably in all operating states without using a tension force sensor, the method determines and stores, during the actuation of a parking brake device, a mean value of the torque of the electric motor necessary for generating the application force of the brake corresponding to the parking brake actuation and simultaneously determines the actuator position and actuates the electric motor at later points of time in such a way that it generates this torque multiplied by a correction factor $k\eta => 1$ so that the exerted tension force is maintained or increased.

11 Claims, 4 Drawing Sheets

METHOD FOR ACTUATING AN ELECTROMECHANICAL PARKING BRAKE DEVICE

TECHNICAL FIELD

The present invention generally relates to a method for actuating electromechanical parking brake devices and more particularly relates to a method for actuating an electromechanical parking brake device for a brake that can be actuated by means of an electromechanical actuator.

BACKGROUND OF THE INVENTION

An electromechanically operable brake of this type is disclosed in international patent application WO 99/45292. The electromechanical parking brake device of the referenced brake consists of a detent pawl that is operable by means of an electromagnet and can be put into engagement with a gear rim fastened at the rotor of the electric motor. However, said publication does not give any hints with regard to the actuation of the parking brake device. The prior art brake is not provided with a sensor for detecting the tension force so that said force has to be estimated on the basis of other data.

BRIEF SUMMARY OF THE INVENTION

Therefore it is an object of the present invention to disclose a method for actuating an electromechanical parking brake device guaranteeing a reliable parking brake function in all operating states without using a tension force sensor.

This object is achieved according to the invention in that during the activation of the parking brake device a mean value of the torque of the electric motor, which is required for exerting the application force of the brake corresponding to the parking brake operation, is determined and stored while the actuator position is simultaneously detected, and the electric motor is actuated at later points of time in such a fashion that it generates said torque which is multiplied by a correction factor $k\eta => 1$ in order to maintain or increase the exerted tension force.

DETAILED DESCRIPTION OF THE PREFERRED EMBODIMENTS

Figure 1:
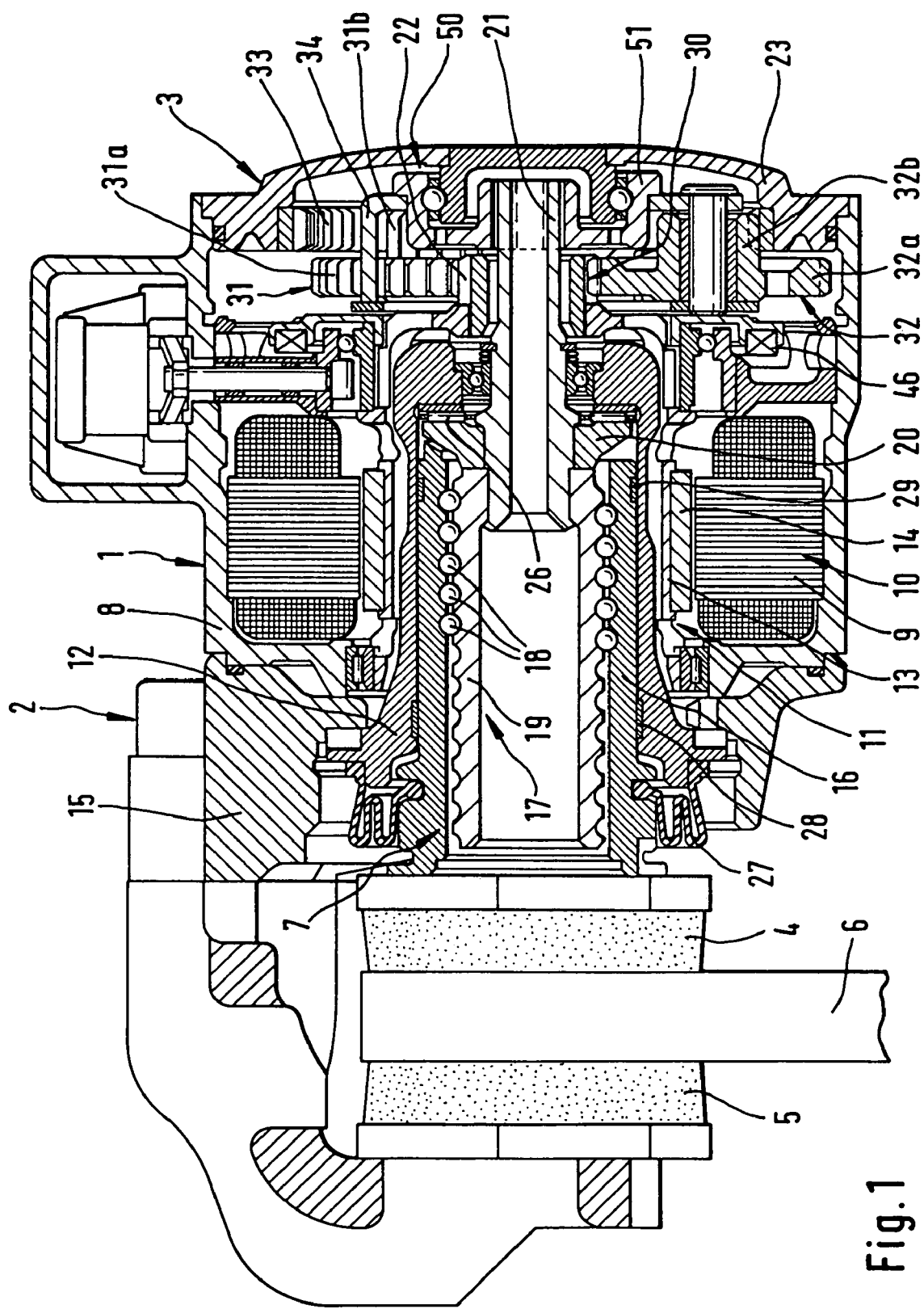
FIG. 1 represents an embodiment of a brake, which can be actuated electromechanically and is provided with an electromechanical parking brake device, and which allows implementing the method according to the invention can be applied, in axial cross-section.

The brake that can be actuated in an electromechanical manner, is represented in particular in FIG. 1, where the method according to the invention is applicable and which is designed as a floating-caliper disk brake, is principally comprised of an electromechanical actuator and a brake caliper which is indicated only schematically and is slideably arranged on a fixed support (not shown). A pair of friction linings 4 and 5 is arranged in the brake caliper in such a way that they are facing the left and the right side of a brake disc 6.

In the following, the friction lining 4 shown at the right in the drawing is indicated as first friction lining and the other friction lining indicated with reference numeral S is defined as second friction lining. While the actuator can bring the first friction lining 4 into direct engagement with brake disc 6 by means of an actuating element 7, through the actuator, the second friction lining 5 is pressed against the opposite lateral face of the brake disc 6 by the effect of a reaction force of the brake caliper caused by the actuation of the assembly. The actuator, which is mounted on the brake caliper by way of fastening means (not shown), has a modular design and consists in principle of three subassemblies or modules, respectively, which can be handled independently of each other, i.e. a drive unit 1, a reduction gear 2 actuating the first friction lining 4 and a second reduction gear 3 inserted, in terms of effect, between the drive unit 1 and the first reduction gear 2.

The above-mentioned drive unit 1 consists of an electric motor 10 provided as a motor which in the example is excited by a permanent magnet and electronically commutated, the stator 9 of which is arranged in an immovable manner in a motor housing 8 and the rotor 11 of which is formed by a ring-type support 13 supporting several segments of permanent magnet 14. The first reduction gear 2 is inserted, in terms of effect, between the electric motor 10 and said actuating element 7, the reduction gear being designed as a ball screw 16 to 21 supported in a gear housing 15 which can also be designed in one part with the above-mentioned brake caliper. The ball screw consists herein of a threaded nut 16 and a threaded spindle 17, several balls 18 being arranged between the threaded nut 16 and the threaded spindle 17 and revolving during the rotational motion of the threaded spindle 17, thus causing the threaded nut 16 to execute an axial or a translatory motion, respectively. The threaded nut 16 preferably forms said actuating element 7. The threaded spindle 17 driven by the electric motor 10 by means of the second reduction gear 3, is formed preferably of three parts consisting of a tubular first spindle part 19 which is in engagement with the threaded nut 16 by means of said balls 18, a ring-type second spindle part 20 as well as a third spindle part 21.

The arrangement is preferably made in such a way that the rotor 11 of motor 10 drives the third spindle part 21 by inserting the second reduction gear 3 while the threaded nut 16 is supported on the first friction lining 4.

In the embodiment described in the drawing, a reduction of the required motor torque is achieved by means of a suitable integration of a planet gear 30-34 forming the second reduction gear 3 mentioned above. The planet gear arranged, in terms of effect, between the rotor 11 and the threaded spindle 17, consists of a sun wheel 30 preferably formed by an externally toothed area 22 on the rotor 11, several stepped planet wheels two of which are represented and indicated with reference numerals 31 and 32, as well as an internally toothed ring 33. The stepped planet wheels 31, 32 mounted in a planet cage 34 are provided with a first stage cooperating with the sun wheel 30 as well as a second stage cooperating with the ring gear 33, the first stage being formed by toothed wheels 31a, 32a of a larger diameter and the second stage being formed by toothed wheels 31b, 32b of a smaller diameter. Said planet cage 34 is preferably designed in such a way that the area between the supporting points of the planet wheels 31, 32 and the connecting point of the threaded spindle 17 allows a small axial as well as a radial play and a small offset angle and is formed, e.g. as a lamellar disc or a bellow. An internally toothed area of a cover 23 forming the housing of the planet gear forms the internally toothed ring 33.

The above-mentioned threaded nut 16 of the ball screw is guided or supported in a bowl-type guide member 12. The threaded nut 16 is supported in the guide member 12 in the area facing the first friction lining 4 by means of a first sliding ring 28 arranged in the guide member 12 as well as in the final area remote from the friction lining 4 by means of a second friction ring 29 arranged on the threaded nut 16.

Furthermore, it can be taken from FIG. 1 that the second ring-type spindle element 20 is supported on a thrust bearing 26 arranged within the guide member 12 while the third spindle element 21 is connected with the planet cage 34 of the second reduction gear 3 by means of a form-locking plug-in connection. To this effect, the end of the third spindle element 21 is e.g. formed as component of a torx connection or as hexagon, which is pushed into a suitable opening in the planet cage 34. In this case it is particularly favorable if the form-locking plug-in connection is coupled in a torsion-proof, radially yielding and flexible manner to the planet cage 34. The coupling is achieved by means of an external ring 51 of a radial bearing 50 provided in the cover 23. An elastic seal or sealing collar 27 clamped between the threaded nut 16 and the guide member 12 prevents the ingress of dirt into the interior of the ball screw.

Furthermore, for a perfect function of the actuation unit according to the invention it is useful that the threaded nut 16 is provided with an axial projection (not shown) on its end remote from the friction lining 4 cooperating with a stop portion formed at the circumference of the second spindle element 20 during the resetting process. By supporting a lateral surface of the projection on the stop portion, a further reset of the threaded nut 16 is reliably prevented so that the two parts 16, 20 do not get jammed.

In order to detect the actual position of the rotor 11, a position detection system 46 is provided which is not shown in detail. The position information is then determined by means of a Hall sensor or a magnetoresistive element.

In order to be able to realize the function of a parking brake, the actuation unit according to the present invention is provided with electromechanical means (see FIG. 2) allowing in cooperation with the rotor 11 of the electric motor 10 the locking of the latter. In the embodiment shown the electromechanical means is formed by means of an electromechanically actuated freewheel designated by reference numeral 35, cooperating with a radial bearing 24 in which the rotor 11 is supported. The electrical actuator associated with the freewheel 35 has the form of a mechanical flip-flop, the state of which changes with each short energization.

Figure 2:
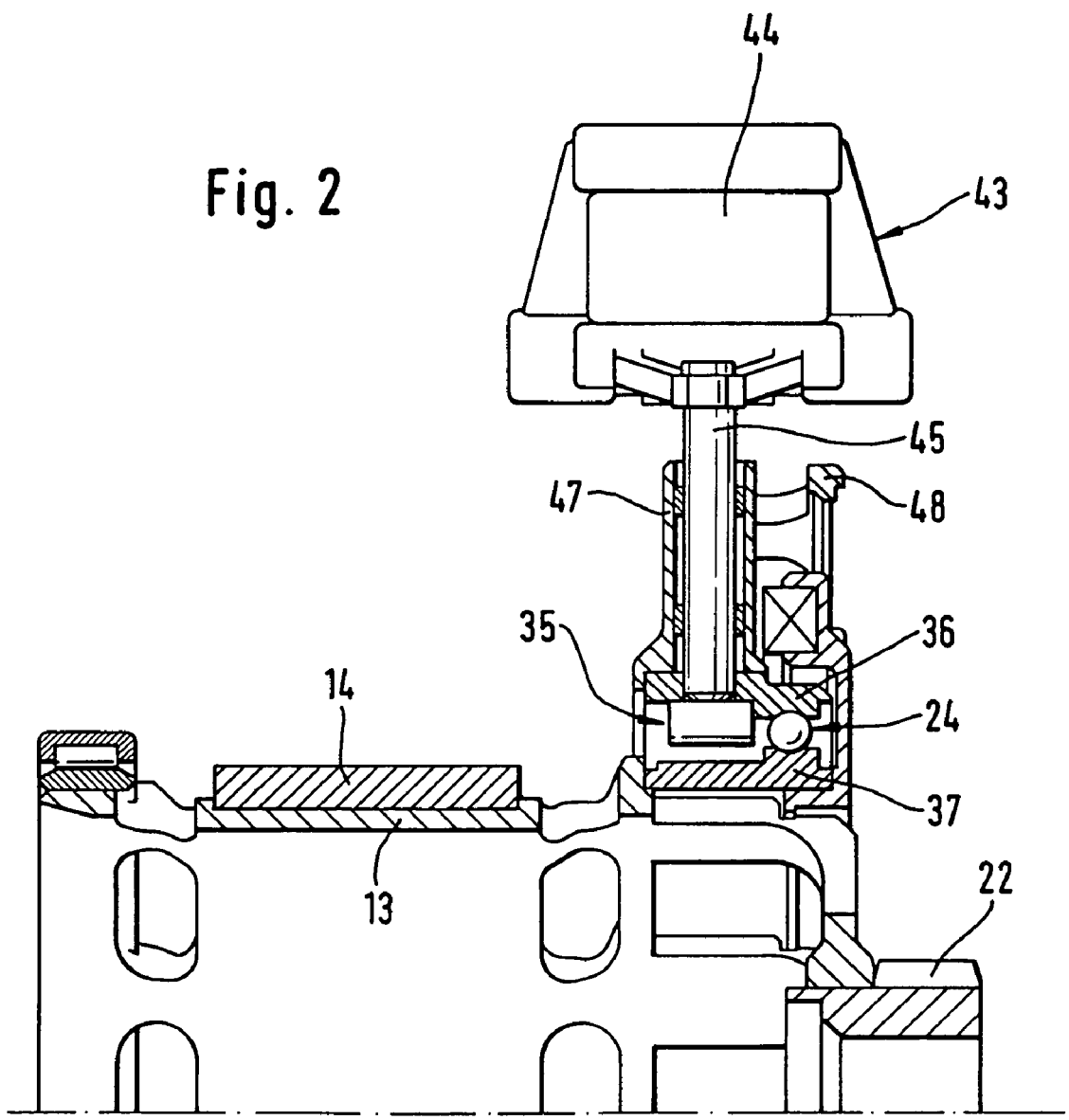
FIG. 2 represents the embodiment of the parking brake device used with the brake according to FIG. 1.
Figure 3:
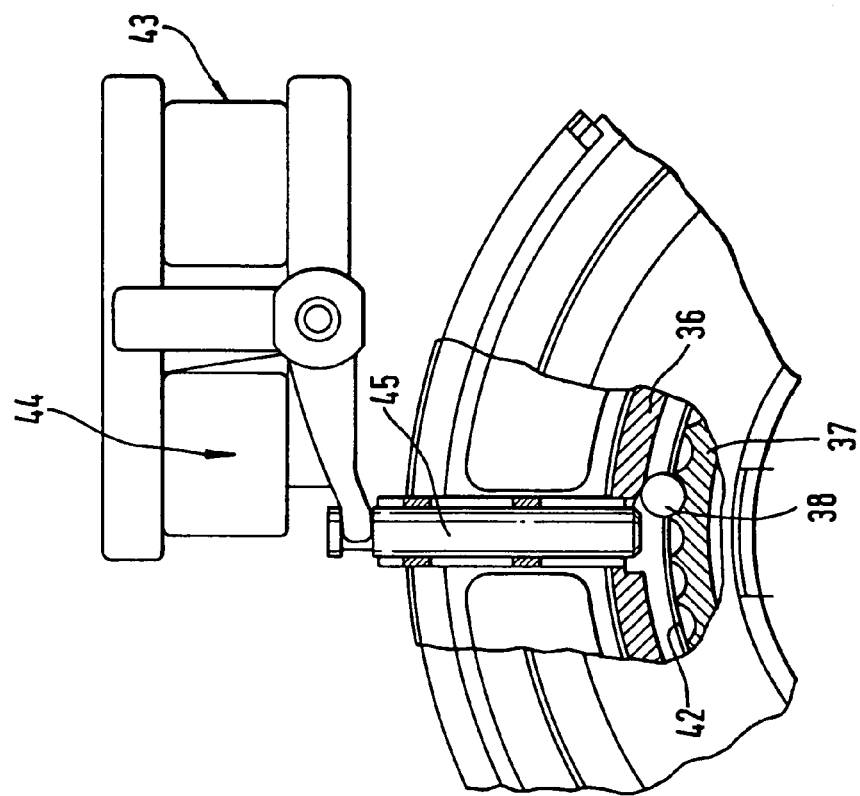
FIG. 3 represents the parking brake device according to FIG. 2 in its initial position in broken-up representation.
Figure 4:
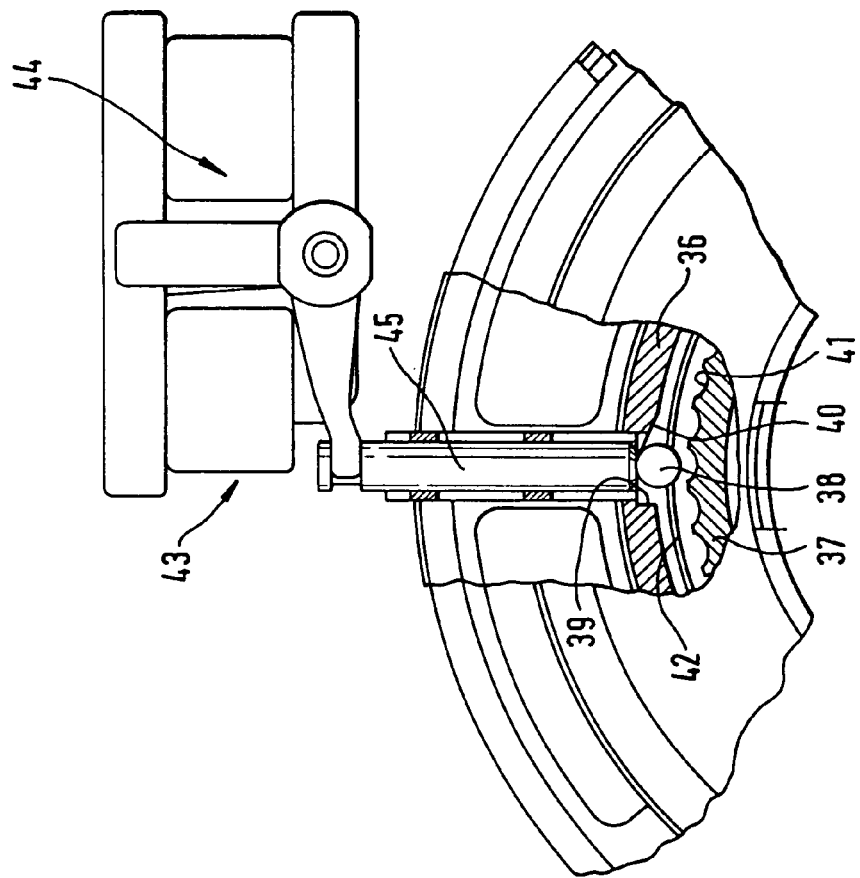
FIG. 4 shows the parking brake device according to FIG. 2 in actuated position in broken-up representation.

As can be taken in particular from FIG. 2 to 4, essential parts of the freewheel 35 are integrated in said radial bearing 24. To this end, the outer ring 36 as well as the inner ring 37 of the radial bearing 24 are extended on one side in such a way that they delimit a ring area accommodating a clamping member 38, thus guaranteeing a form-locking connection between the bearing rings 36, 37 and the clamping member 38 by the particular configuration of the extended area of the bearing rings 36, 37. The outer ring 36 is preferably provided with a radial recess 39 in its area cooperating with the clamping member 38, the recess being limited on one side by an inclination or ramp 40, while the inner ring 37 is provided with a contour 41 corresponding to the contour of the clamping member 38 and limiting a clamping gap together with the recess 39. The clamping member 38, which can be designed as a clamping roll or in the form of a ball, is pretensioned by means of a ring-type spring member 42 towards said recess 39.

An electromagnetic actuation unit is used for actuating the freewheel 35, being designated by the reference numeral 43 in the example illustrated. The actuation unit 43 essentially consists of a bistable electromagnet 44 as well as a tappet 45 cooperating with the armature of the electromagnet 44 displacing the clamping member 38 radially when activating the electromagnet 44. The tappet 45 is guided in a tubular guide member 47 formed on a ring-type accommodating member 48 arranged in the motor housing 8 and accommodating the bearing outer ring 36.

Figure 5:
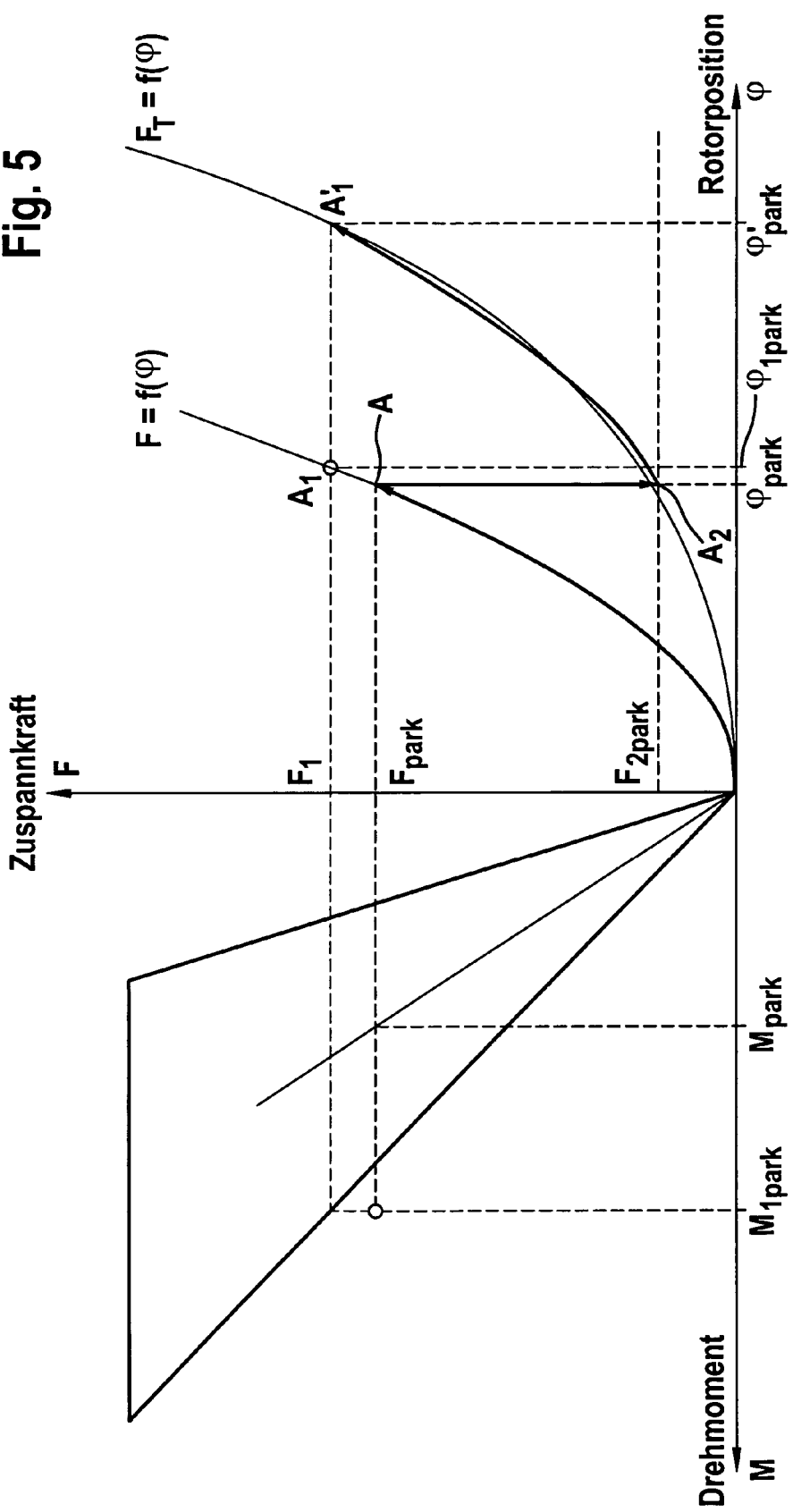
FIG. 5 is a flow chart showing the method according to the present invention.

When activating the parking brake device 35, the following functional order is provided and described in detail with regard to FIG. 5:

First the electromechanical brake is applied by corresponding operation of the electric motor 10 until the necessary application force level $F_{park}$ is reached. The brake is assumed to be in "warm" condition so that the activation of the parking brake device is realized according to the characteristic $F$-$f(\phi)$. The application force $F_{park}$ to be adjusted is achieved with an actuator position or the rotor position defined with $\phi_{park}$. In point A defined by the coordinates $\phi_{park}$, $F_{park}$ the parking brake device 35 is locked. At the same time the mean value $M_{park}$ of the torque produced by the electric motor 10 is determined by measuring the current supplied to the electric motor 10 corresponding to the efficiency=1 of the assembly. The mean value is preferably examined with regard to a lower limit value. If the mean value of the torque is below said limit value, the torque (and thus also the application force) is increased up to this limit value. If the mean value of the torque is above said limit value, the application force adjusted by the control is maintained. The mean value of the torque applied to the brake is stored in a non-volatile memory (EEPROM). Then the mean torque value $M_{park}$ is multiplied by a correction factor $k\eta$>1 in an electronic control unit (not shown), thus defining a higher torque value $M_{1park}$. Under the assumption that in this case the ascending branch of the characteristic hysteresis curve depending on the efficiency has to be considered or is used, a higher application force $F_1$ results from the higher torque value $M_{1park}$ which corresponds to a locking point $A_1$ on the characteristic curve $F$=$f(\phi)$. A changed actuator position $\phi_{1park}$ corresponds to the additional operation of the actuator according to the mentioned application force increase.

It has to be mentioned that the rotor 11 or the bearing inner ring 37, respectively, is displaced against the clamping direction of the freewheel 35, i.e. to the left in the drawing, when the brake is applied. When the clamping member 38 is displaced towards the countour 41 by activating the electromagnet 44, when the parking brake is actuated, the clamping member rolls towards the tapering clamping gap on the above-mentioned ramp 40. If the current supplied to the electric motor 10 is reduced, the spring force of the applied brake tries to turn the rotor 11 or the bearing inner ring 37 towards the clamping direction. Thus, the parking brake device is securely locked. The locked position of the parking brake device is represented in FIG. 4.

If the parking brake device is released after a short period of time (while a brake re-application has not yet taken place) the electric motor 10 has to continue for a defined period of time to apply the brake by defining a torque value $M_{rel}$=$k_{rel}$*$k_m$*$M_{park}$ exceeding considerably the torque $M_{park}$ defined before and the electromagnet 44 has to be actuated once in order again to move the tappet 45 upwards. The clamping member 38 relieved hereby is pressed into the recess 39 of the bearing outer ring 36 by the force of the spring element 42 by which it is pretensioned and the rotor 11 can freely turn in both directions. A release of the parking brake device can alternatively also be achieved by that the electric motor is operated for a predefined period of time in such a way that it generates its maximum torque $M_{max}$.

The procedure is similar in the case in which the preset application force is reduced to a value denominated $F_{2park}$ due to cooling down of the brake with unchanged actuator position $\phi_{park}$, with the parking brake device being locked in point A. Equivalent to this value is an operating state represented by a point $A_2$ on a characteristic curve $F_T=f(\phi)$ valid for the cooled condition of the brake and caused by a temperature-dependent displacement of the above-mentioned characteristic curve. The repeated actuation of the electric motor 10 necessary for increasing the required application force to said value $F_1$, is represented by the coordinate $\phi'_{park}$.

Within the scope of the present invention, of course several modifications of the method claimed are also possible. Hence, the method can be repeated in previously defined periods of time after the first activation of the parking brake device, if necessary, depending on a temperature difference of the actuator. Here, the actuator temperature difference corresponds preferably to the difference between the actuator temperature during the first activation of the parking brake device or during the last re-application of the brake and the actual actuator temperature estimated e.g. by means of an actuator temperature model. Said correction factor $k\eta$ depends on the actuator efficiency or on a measured or estimated inclined position of the vehicle, respectively. Besides, it is possible that during the release operation of the parking brake after a further necessary application of the brake a new characteristic curve for actuator position and application force of the actuator is estimated.

The invention claimed is:

1. Method for actuating an electromechanical parking brake device for a brake that can be actuated by means of an electromechanical actuator, in which the actuator is comprised of an electric motor and a reduction gear that is connected downstream of the electric motor and is provided for converting a rotational motion into a translatory motion, and the electromechanical parking brake device is provided in the form of a locking mechanism which can prevent the rotational motion of the actuator in the direction of release and which can only be released again by further application, wherein during the actuation of the parking brake device, a mean value $M_{park}$ of the torque of the electric motor, which is required for exerting the application force of the brake corresponding to the application of the parking brake, is determined and stored while the actuator position ($\phi$) is simultaneously detected, and the electric motor is actuated at later points in time in such a fashion that it generates said torque $M_{park}$ that is multiplied by a correction factor $k\eta=>1$ in order to maintain or increase the exerted tension force, wherein the determined mean torque value (Mpark) is controlled with regard to a lower limit value and is set to this lower limit value when it falls below this limit value.

2. Method according to claim 1, wherein the detection of the torque ($M_{park}$) is achieved by measuring the current supplied to the electric motor.

3. Method according to claim 1, wherein the electric motor after the first actuation of the parking brake device is actuated in previously defined periods of time in such a way that it generates the torque ($M_{park}$) multiplied by the correction factor $k\eta=>1$.

4. Method according to claim 1, wherein the electric motor is actuated depending on an actuator temperature difference in such a way that it generates the torque ($M_{park}$) multiplied with the correction factor $k\eta=>1$.

5. Method according to claim 4, wherein the actuator temperature is estimated by means of an actuator temperature model.

6. Method according to claim 1, wherein the correction factor $k\eta$ depends on the actuator efficiency.

7. Method according to claim 1, wherein the correction factor $k\eta$ depends on a measured or estimated inclined position of the vehicle.

8. Method according to claim 1, wherein during releasing the parking brake device a new characteristic curve for actuator position—application force is estimated.

9. Method for actuating an electromechanical parking brake device for a brake that can be actuated by means of an electromechanical actuator, in which the actuator is comprised of an electric motor and a reduction gear that is connected downstream of the electric motor and is provided for converting a rotational motion into a translatory motion, and the electromechanical parking brake device is provided in the form of a locking mechanism which can prevent the rotational motion of the actuator in the direction of release and which can only be released again by further application, wherein during the actuation of the parking brake device, a mean value $M_{park}$ of the torque of the electric motor, which is required for exerting the application force of the brake corresponding to the application of the parking brake, is determined and stored while the actuator position ($\phi$) is simultaneously detected, and the electric motor is actuated at later points in time in such a fashion that it generates said torque $M_{park}$ that is multiplied by a correction factor $k\eta=>1$ in order to maintain or increase the exerted tension force, wherein the actuator temperature difference corresponds to the difference between the actuator temperature during the first actuation of the parking brake device or the last operation the electric motor, respectively, for generating the torque ($M_{park}$) multiplied by the correction factor $k\eta=>1$ and the actual actuator temperature.

10. Method for actuating an electromechanical parking brake device for a brake that can be actuated by means of an electromechanical actuator, in which the actuator is comprised of an electric motor and a reduction gear that is connected downstream of the electric motor and is provided for converting a rotational motion into a translatory motion, and the electromechanical parking brake device is provided in the form of a locking mechanism which can prevent the rotational motion of the actuator in the direction of release and which can only be released again by further application, wherein during the actuation of the parking brake device, a mean value $M_{park}$ of the torque of the electric motor, which is required for exerting the application force of the brake corresponding to the application of the parking brake, is determined and stored while the actuator position ($\phi$) is simultaneously detected, and the electric motor is actuated at later points in time in such a fashion that it generates said torque $M_{park}$ that is multiplied by a correction factor $k\eta=>1$ in order to maintain or increase the exerted tension force, wherein for releasing the parking brake device the electric motor is actuated for a predefined period of time in such a way that a torque specification $M_{rel}=k_{rel}*k_\eta*M_{park}$ is satisfied.

11. Method for actuating an electromechanical parking brake device for a brake that can be actuated by means of an electromechanical actuator, in which the actuator is comprised of an electric motor and a reduction gear that is connected downstream of the electric motor and is provided for converting a rotational motion into a translatory motion, and the electromechanical parking brake device is provided in the form of a locking mechanism which can prevent the rotational motion of the actuator in the direction of release and which can only be released again by further application, wherein during the actuation of the parking brake device, a mean value $M_{park}$ of the torque of the electric motor, which is required for exerting the application force of the brake corresponding to the application of the parking brake, is determined and stored while the actuator position ($\phi$) is simultaneously detected, and the electric motor is actuated at later points in time in such a fashion that it generates said torque $M_{park}$ that is multiplied by a correction factor $k\eta =>1$ in order to maintain or increase the exerted tension force, wherein for releasing the parking brake device the electric motor is operated for a predefined period of time in such a way that its maximum torque $M_{rel}=M_{max}$ is generated.

* * * * *